Dec. 20, 1932.  N. M. STANLEY  1,891,361
LIQUID DISPENSER
Filed Sept. 24, 1930

INVENTOR
NATHAN M. STANLEY
BY Toulmin & Toulmin
ATTORNEY

Patented Dec. 20, 1932

1,891,361

UNITED STATES PATENT OFFICE

NATHAN M. STANLEY, OF DAYTON, OHIO

LIQUID DISPENSER

Application filed September 24, 1930. Serial No. 484,093.

This invention relates to improvements in liquid dispensers, and has for its object to provide means for inclosing a dispensing container in such a manner that the liquid within the container is protected from evaporation.

It is a further object of this invention to provide, in connection with a vial having in the open end thereof a wick for dispensing liquids such as perfume, smelling salts and similar liquids, a casing for protecting the liquid in the vial from evaporation, said casing having one end entirely open for receiving the vial and a removable closure for said open end, the other end of the casing being restricted to form an abutment for the stopper of the vial and an opening for the passage of the wick.

It is also an object of this invention to provide, in connection with a casing as just described, a closure for the exposed wick. This closure is adapted to engage the end of the casing surrounding the wick, and inclose the exposed end of the wick in such a manner that no evaporation of the contents of the vial can take place.

It is also an object of this invention to provide, in connection with a closure for a casing, a packing between the closure and the casing so that evaporation cannot take place within the closure.

These and other advantages will appear from the following description taken in connection with the drawing.

Referring to the drawing.

Figure 1:
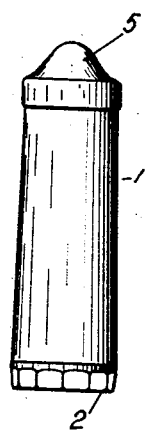
Figure 1 is a side elevation of the complete casing containing the vial with the contents therein.
Figure 2:
Figure 2 is a view similar to Figure 1 with the lid or closure partly removed and the bottom likewise partly removed.

This invention consists of essentially two parts, a casing and a liquid containing and dispensing vial within the casing. The casing is indicated by the numeral 1 and has a screw threaded removable bottom 2. On top of the bottom there is a cork packing 3. This packing may be made of any suitable material and is adapted to support the lower end of the vial within the casing. The casing, the bottom and the closure therefor are made of any suitable material. They may be made of porcelain, a condensation product, or any other suitable material.

The upper end of the casing is turned inward to form flanges 4, which provide a restricted opening therein for receiving a wick in the vial within the casing. For the purpose of closing the upper end of the casing and forming a complete closure for the wick-receiving opening therein, a closure or cap 5 is provided. This cap is threaded onto the body of the casing in the same manner that the bottom is, except in the case of the closure or cap it is threaded upon the periphery while the bottom is threaded within the end of the casing. The cap is cone-shaped and has an annular flange by which it is threaded onto the upper end of the casing.

The extreme upper conical part of the cap has an opening therein to receive the exposed end of a wick, and around this opening is a gasket or packing 6. When the cap or closure is placed upon the upper end of the casing the gasket or packing engages the flanges and forms a tight closure so that the contents of the vial within the casing cannot escape therefrom.

Figure 3:
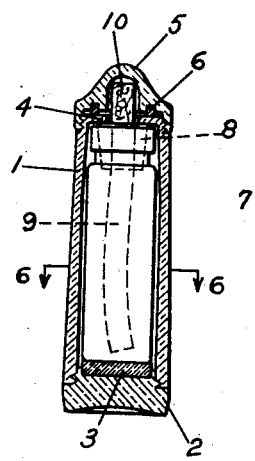
Figure 3 is a longitudinal section through the apparatus, as shown in Figure 1.
Figure 4:
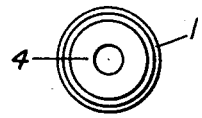
Figure 4 is a top plan view of the casing with the lid or closure removed.
Figure 5:
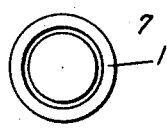
Figure 5 is a bottom plan view of the lower end of the casing with the bottom removed.
Figure 6:
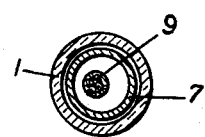
Figure 6 is a section on the line 6—6 of Figure 1.
Figure 7:
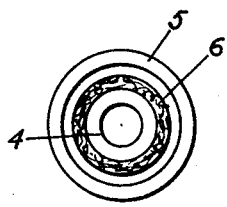
Figure 7 is a bottom plan view of the lid or closure.
Figure 8:
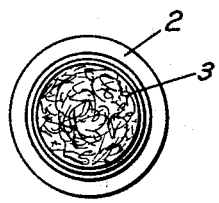
Figure 8 is a top plan view of the bottom removed from the casing.
Figure 9:
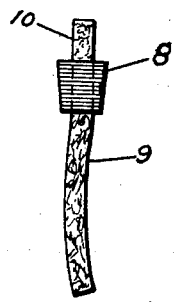
Figure 9 is a side elevation of the wick and the cork.

Within the casing is a bottle or vial 7 which contains the liquid to be dispensed. In the mouth end of this bottle is a stopper 8, made of rubber or some other suitable material. In the present instance it is made of rubber. Extending through this stopper and projecting therefrom at the upper end is a wick 9. This wick extends substantially from the bottom of the bottle or vial up through the stopper and projects into the cavity formed in the cap or closure, as shown in Figure 3. The wick may be made of any suitable material. The extended part or end of the wick is indicated by the numeral 10.

In assembling the parts the bottom is removed, the vial is supposed to be full of the liquid to be dispensed and the wick and stopper are in place. The vial with the wick and stopper therein is placed in the casing through the open bottom, and the exposed end of the wick is inserted through the restricted opening in the flange end of the casing. After the vial has been thus placed the bottom is threaded onto the body of the casing so that the packing 3 engages the bottom of the vial or bottle and holds it firmly in place with the stopper against the flange 4, so that an air-tight closure is formed between this flange and the stopper.

When it is desired to dispense the liquid within the vial the cap or closure is removed so that the end of the wick is exposed. The wick then is rubbed on an object which is to receive the liquid from the vial. In the case of perfume the wick may be rubbed on any part of the body or clothes. In the case of smelling salts, the end of the wick may be placed adjacent the nose for smelling purposes. After the liquid has been dispensed the cap or closure is replaced so that the gasket 6 closely engages the flange and forms a gas-tight closure so that no liquid can escape by evaporation from the vial between the body of the casing and the closure therefor.

This dispensing apparatus is small, can be carried in purses or small pockets, and occupies a small amount of space and is sufficiently strong and durable to protect the vial within the casing from breaking. It is easily repaired, easily operated for replenishing the liquid within the vial or container.

Figure 10:
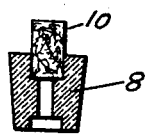
Figure 10 is a section through the stopper showing a modified form of stopper and wick support.

In Figure 10 is shown a modification in which the stopper 8 carries a short section of the wick 10, the liquid being conveyed through a capillary passage below the wick in the stopper. The stopper may support a capillary glass tube for the same purpose.

I desire to comprehend within my invention such modifications as may be embraced within my claims and the scope of my invention.

Having thus fully described my invention, what I claim is new and desire to secure by Letters Patent, is:

1. In a dispenser, in combination with a container having a stopper and a wick in the stopper, a casing having an opening in one end to receive the container and a flange and a restricted opening at the other end, said restricted opening being adapted to receive the wick and the flange adapted to engage the stopper, and means adapted to close the container receiving opening and press the stopper against the flange.

2. In a dispenser, in combination with a container having a stopper and a wick projecting from the stopper, a casing having an opening in one part to receive the container and another part adapted to engage the stopper and form an opening for the wick, and means to close said first opening and hold the container in the casing with the stopper against said other part.

3. In a dispenser, in combination with a container having a stopper and a wick projecting from the stopper, a casing having an opening in one part to receive the container and another part adapted to engage the stopper and form an opening for the wick, and a closure for said first opening having a packing to engage the container and hold it in the casing with the stopper against said other part.

4. In a dispenser, in combination with a container having a stopper and a wick projecting from the stopper, a casing having an opening in one part to receive the container and another part adapted to engage the stopper and form an opening for the wick, a closure for said first opening having a packing to engage the container and hold it in the casing and the stopper against the other part, and a closure for the second opening inclosing the projecting end of the wick.

5. In a dispenser, in combination with a vial having a stopper and a wick projecting from the stopper, a casing having an opening in one part to receive the vial and another part adapted to engage the stopper and form an opening for the wick, a closure for said first opening having a packing to engage the vial and hold it in the casing and the stopper against the other part, and a closure for the second opening inclosing the projecting end of the wick and having thereon a packing to engage said casing around said second opening.

6. In a dispenser, in combination with a vial having a stopper and a wick projecting from the stopper, a casing open at one end to receive the vial and having its other end partly closed by a flange forming a restricted opening, said second opening being adapted to receive the wick with the stopper against the flange, a closure for the first opening having a packing to engage the vial and hold the stopper against the flange, and a closure for the second opening inclosing the projecting end of the wick.

7. In a dispenser, in combination with a vial having a stopper and a wick projecting from the stopper, a casing open at one end to receive the vial and having its other end partly closed by a flange forming a restricted opening, said second opening being adapted to receive the wick with the stopper against the flange, a closure for the first opening having a packing to engage the vial and hold the stopper against the flange, a closure for the second opening inclosing the projecting end of the wick, and an annular gasket on said closure adapted to engage the flange around said second opening.

8. A wick, a rubber support therefor forming a bottle closure, a bottle and a casing for said bottle having a wick aperture and a flange forming the aperture resting on the top of the bottle, and means detachably mounted on said casing at the bottom thereof for retaining the bottle in the casing.

9. A wick, a rubber support therefor forming a bottle closure, a bottle and a casing for said bottle having a wick aperture and a flange forming the aperture resting on the top of the bottle, and means detachably mounted on said casing at the bottom thereof for retaining the bottle in the casing, said bottle being transparent so that the contents can be seen therein and said casing being non-transparent so that the bottle cannot be seen therein.

10. A wick, a rubber support therefor forming a bottle closure, a bottle and a casing for said bottle having a wick aperture and a flange forming the aperture resting on the top of the bottle, means detachably mounted on said casing at the bottom thereof for retaining the bottle in the casing, said bottle being transparent so that the contents can be seen therein and said casing being non-transparent so that the bottle cannot be seen therein, and a non-transparent detachable cover for said casing over said wick.

In testimony whereof, I affix my signature.

NATHAN M. STANLEY.